United States Patent
Prehn et al.

(10) Patent No.: US 9,521,510 B2
(45) Date of Patent: Dec. 13, 2016

(54) SUBSCRIBER LOCATION DATABASE

(71) Applicant: Verizon Patent and Licensing Inc., Arlington, VA (US)

(72) Inventors: Paul H. Prehn, Clayton, CA (US); Brian Olson, Clayton, CA (US); Cora Kasaji Kalukuta, Oakland, CA (US); Javier M. Lopez, Alameda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 255 days.

(21) Appl. No.: 14/315,037

(22) Filed: Jun. 25, 2014

(65) Prior Publication Data

US 2015/0382137 A1 Dec. 31, 2015

(51) Int. Cl.
| | |
|---|---|
| *G06F 15/00* | (2006.01) |
| *G06F 13/00* | (2006.01) |
| *H04W 4/02* | (2009.01) |
| *G06F 17/30* | (2006.01) |

(52) U.S. Cl.
CPC ............ *H04W 4/02* (2013.01); *G06F 17/3087* (2013.01)

(58) Field of Classification Search
CPC .......................... H04L 12/5815; H04L 51/043
USPC ......... 715/700, 763–765, 851–852, 740–748, 715/734–736
See application file for complete search history.

(56) References Cited

U.S. PATENT DOCUMENTS

| | | | | |
|---|---|---|---|---|
| 7,496,191 | B1 * | 2/2009 | Crews ................. | G06F 21/6218 379/142.02 |
| 7,826,830 | B1 * | 11/2010 | Patel .................... | H04L 12/5815 455/414.1 |
| 7,853,786 | B1 * | 12/2010 | Fultz ..................... | H04L 63/102 713/155 |
| 8,391,886 | B1 * | 3/2013 | Thaper .............. | H04M 3/42348 455/414.1 |
| 2012/0198020 | A1 * | 8/2012 | Parker ................... | H04W 12/08 709/217 |
| 2014/0274000 | A1 * | 9/2014 | Gosselin ............. | H04M 3/4365 455/415 |

* cited by examiner

*Primary Examiner* — Kevin Nguyen

(57) ABSTRACT

A system may be configured to allow for storage of location information regarding a set of user devices. The location information may be updated relatively frequently, and without introducing additional traffic into a wireless telecommunications network associated with the user devices. The location information may be made available to internal devices associated with the wireless telecommunications network and/or to external third party devices (such as banks, payment card processors, or advertisers) with user consent. Since the information is obtained and stored prior to requests, the location information may be provided, in response to requests, relatively quickly.

19 Claims, 9 Drawing Sheets

SUBSCRIBER LOCATION DATABASE

BACKGROUND

User devices, such as mobile telephones, smart phones, etc., may be carried by users on a regular basis. The location of a user device may typically be determined by a service provider associated with the user device. For example, the service provider may perform cell tower triangulation, may query the user device for the location of the user device, etc., in order to determine the location of the user device.

DETAILED DESCRIPTION OF PREFERRED EMBODIMENTS

Figure 1:
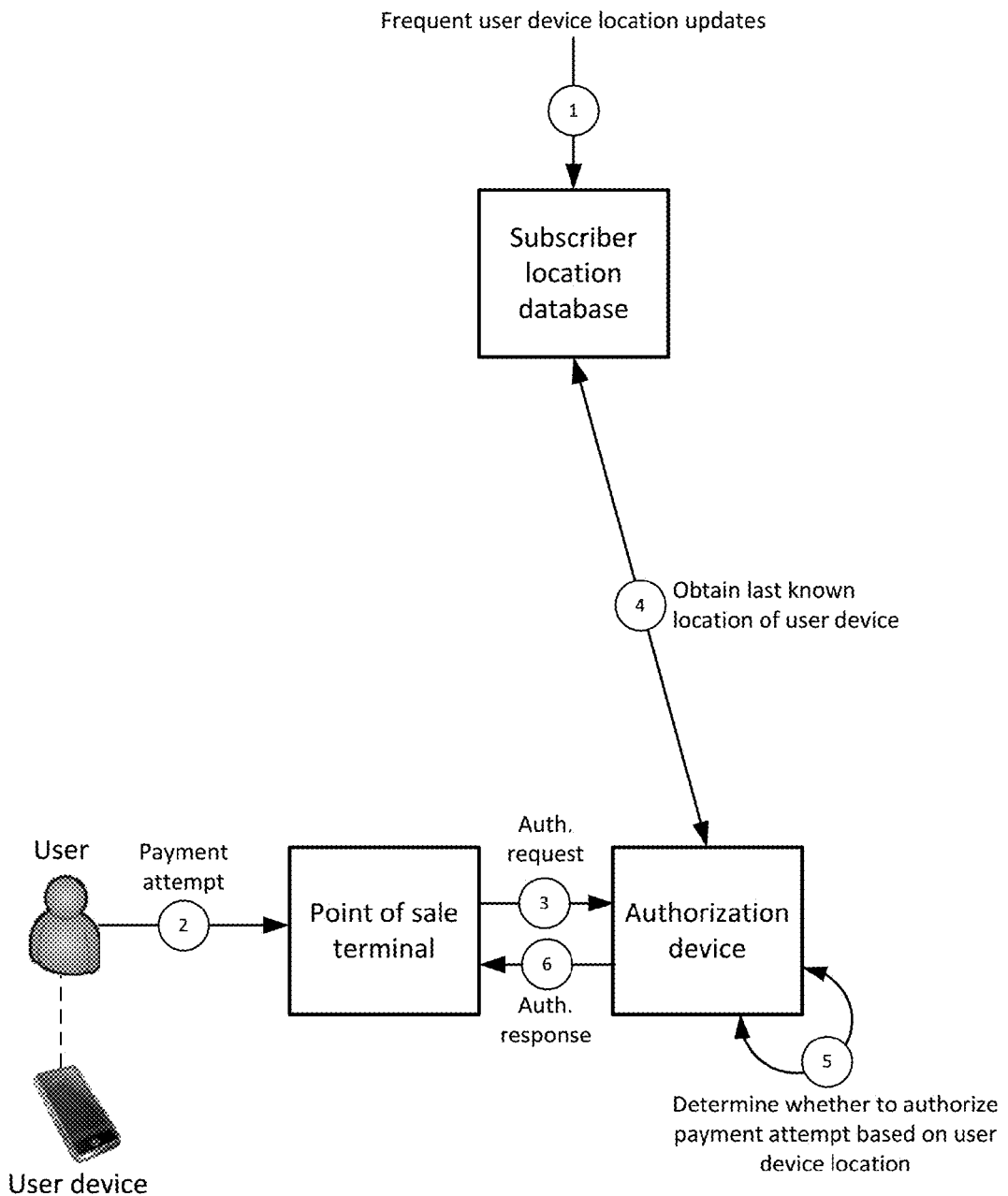
FIGS. 1-4 illustrate example overviews of implementations described herein.

The following detailed description refers to the accompanying drawings. The same reference numbers in different drawings may identify the same or similar elements.

Some implementations, described herein, may allow for low-latency access to frequently updated and/or highly granular user device location information. For example, a subscriber location database ("SLD") may receive location information, regarding a set of user devices, on a relatively frequent basis (e.g., whenever a network event occurs, such as when a voice call is placed, when a data connection is established or torn down, etc.). The location information may be received from a service provider associated with the user devices, from a third party, and/or from another source, and may be obtained using a variety of techniques. The SLD may provide an interface (such as an application programming interface ("API")) via which the SLD may provide on-demand access to location information associated with user devices. For example, an external device may query the SLD for the last known location, or a location history, associated with a particular user device.

Using the SLD, as described herein, may save network and/or processing resources, compared to conventional techniques for determining a location of a user device. Further, querying the SLD for a location of a user device may consume less time than conventional techniques. For example, typically, when determining the location of a user device, a request may be made to a service provider's network and/or to the user device itself. Thus, in conventional techniques, multiple devices may be involved in the determination of the user device, which may consume resources, as well as time. Further, additional traffic may be generated (e.g., traffic sent between the multiple devices, regarding the request for the location and the response to the request). The SLD, however, may receive location information on an ongoing basis, which may be obtained without introducing extra traffic related to location determination. Further, since the SLD stores location information, network devices and/or the user device may not need to be queried in order to obtain the location of the user device.

The information, stored and/or obtained by the SLD or other devices, may be stored and/or collected on an "opt-in" basis. In some implementations, a user may be given the opportunity to review information (such as location information) that has been collected, regarding or on behalf of the user, and to delete the information and/or make the information unavailable for use. In some implementations, the user may have the opportunity to "opt out," in which case the SLD may cease receiving and/or storing information regarding the user, and may delete any existing information regarding the user. Further, the user may have the option to share the information with individual third parties (such as payment processors, advertisers, etc.), or to refrain from sharing the information with any or all parties. In some implementations, the third parties may be required to obtain user consent before third parties are able to access information stored in the SLD.

FIGS. 1-4 illustrate example implementations, in which an SLD may be used to provide location information regarding a user device. While examples are discussed below, in practice, the information stored and provided by the SLD may be used in a variety of other ways.

As shown in FIG. 1, an SLD may be used in the prevention of fraud during transactions involving payment cards (e.g., credit cards, debit cards, etc.). As shown, the SLD may receive (at arrow 1) user device location updates. The location updates may be received from a network associated with the user device, a third party device, and/or another source. The location updates may indicate a geo-location of the user device (e.g., latitude and longitude coordinates), and may be obtained relatively frequently. For example, the location updates may be received at intervals that are based on the occurrence of network events (e.g., starting or ending a voice call, establishing or tearing down a data connection, sending or receiving a text message, etc.), and/or at other intervals. The location updates may, in some implementations, be obtained using conventional techniques.

The SLD may store the location information (e.g., the last known location and/or the last few known locations of the user device) with identifying information (e.g., a mobile directory number ("MDN")) that indicates the user device to which the location information is associated. In this manner, location information may be stored on a per-user device basis. The SLD may make the location information available via an interface (e.g., an API). For example, as discussed below, an authorization device, which may be associated with a bank, a payment card company, etc., may communicate with the SLD, via the interface, in order to obtain location information regarding the user device (e.g., the last known location of the user device).

As shown in FIG. 1, a user (e.g., a user associated with the user device) may attempt (at arrow 2) to make a payment via a point of sale ("POS") terminal (e.g., a device that processes and/or authorizes payment card transactions). For example, the user may physically hand a payment card to a cashier associated with the POS terminal, may insert the payment card into the POS terminal, etc. The POS terminal may request (at arrow 3 ("Auth. request")) authorization, from the authorization device, to process the payment card.

The authorization device may identify an MDN associated with the payment card (e.g., based on previously stored information), and may obtain (at arrow 4) the last known location of the user device from the SLD. For example, the authorization device may provide the MDN when requesting the last known location.

The authorization device may determine (at arrow 5) whether to authorize the payment attempt based on the received location information. For instance, if the last known location of the user device was relatively close to the POS terminal (e.g., within a threshold distance), and/or if the last known location was determined relatively recently (e.g., within a threshold time before the payment attempt was made), the authorization device may determine that the payment attempt should be allowed. On the other hand, if the last known location of the user device was relatively far away from the POS terminal (e.g., beyond a threshold distance), and/or if the last known location was not determined relatively recently (e.g., beyond a threshold time before the payment attempt was made), the authorization device may determine that the payment attempt should be denied. In some implementations, the last known location may be one of several factors that the authorization device uses to determine whether to authorize the payment attempt. The authorization device may provide (at arrow 6 ("Auth. response")) a response to the POS terminal, indicating whether the payment attempt was authorized or not.

Figure 2:
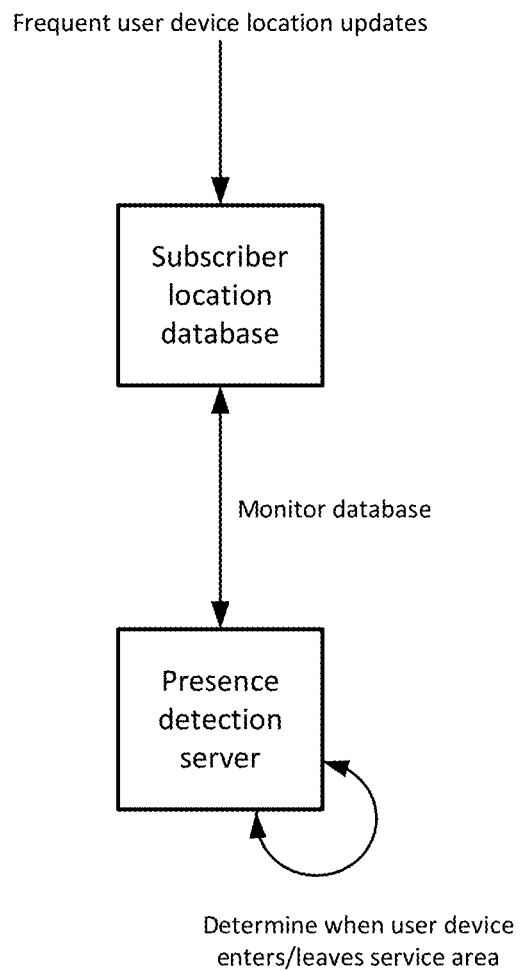

FIG. 2 illustrates an example implementation in which information, stored by the SLD, may be used to detect when a user device enters and/or leaves a particular area, such as a service area. For example, a service provider may desire to determine when a user device is "roaming" (e.g., when the user device is outside of a service area associated with the service provider, such as in a different country), or has returned from roaming. As shown, a presence detection server may monitor the SLD. For instance, the presence detection server may determine when new entries are present in the SLD (e.g., an entry that corresponds to a user device for which location information was not previously present in the SLD; or an entry that corresponds to a user device for which location information has not been received for at least a threshold amount of time). As another example, the presence detection server may determine when entries have been removed from the SLD (e.g., the removal of an entry that corresponds to a user device for which location information was previously present in the SLD; or an entry that corresponds to a user device for which location information has been received after at least a threshold amount of time). In addition to, or in lieu of, monitoring the SLD, the presence detection server may receive "push" alerts from the SLD, which indicate the addition or removal of entries that correspond to user devices.

Figure 3:
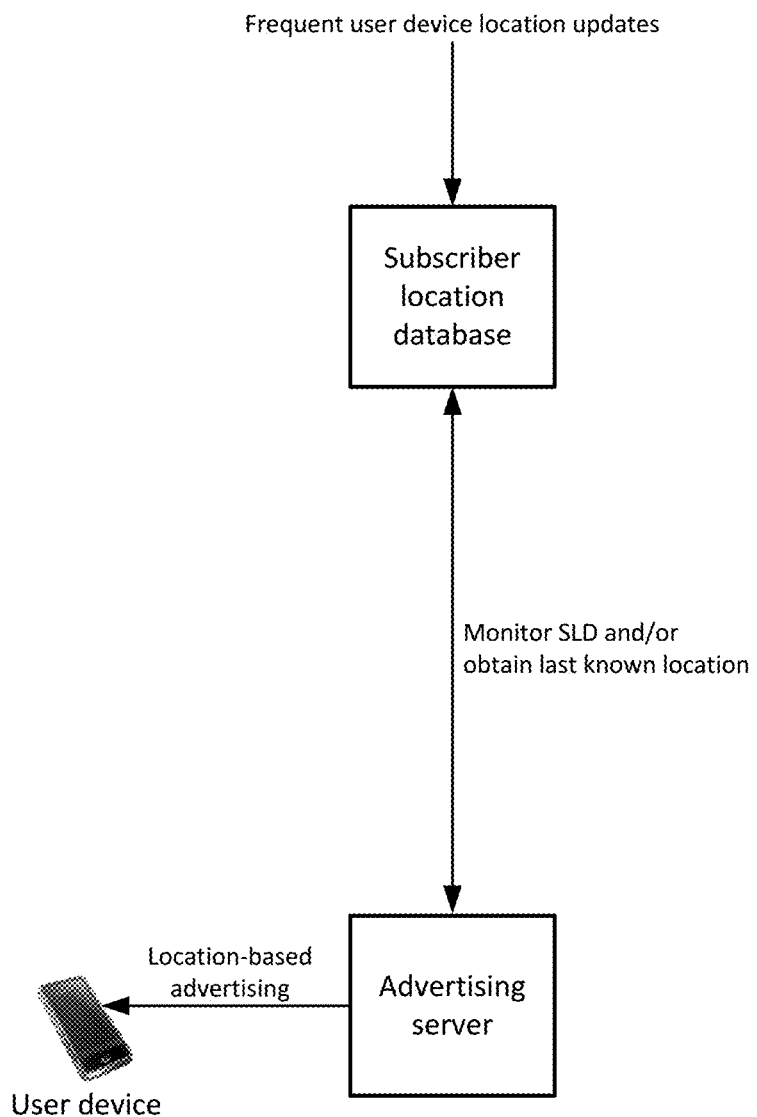

FIG. 3 illustrates an example implementation in which information, stored by the SLD, may be used for advertising purposes. As shown, an advertising server may monitor the SLD, and/or may obtain the last known location of a user device. By monitoring the SLD, the advertising server may be able to generate history information, which may indicate locations that the user device visited, how long the user device was at the locations, etc. The advertising server may be able to determine advertising, based on the history information (e.g., based on types of businesses the user device has visited, based on roads on which the user device has traveled, etc.). In some implementations, the advertising server may generate location-based advertising based on a present location of the user device (e.g., a coupon for a store at which the user device is presently located, and/or toward which the user device is headed).

Figure 4:
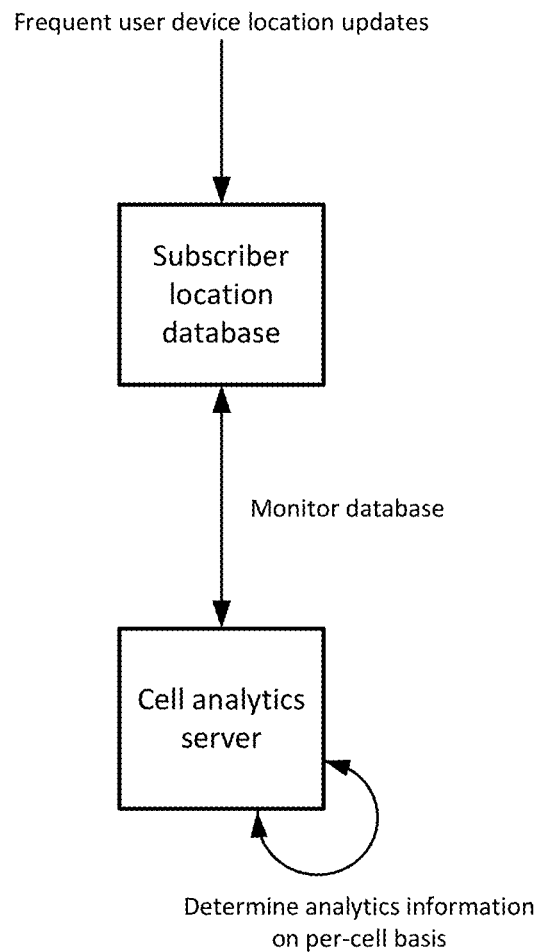

FIG. 4 illustrates an example implementation in which information, stored by the SLD, may be used to determine analytics information associated with cells of a wireless telecommunications network. As shown, a cell analytics server may monitor the SLD, in order to determine trends and/or other information associated with cells. For example, the cell analytics server may compare the information, from the SLD, to information indicating locations of cells (e.g., service areas associated with particular cells), in order to obtain user device location information on a per-cell basis. Based on the per-cell information, the cell analytics server may identify, for example, trends relating to cells for which the same user devices generally stay relatively stationary, trends relating to cells for which many different user devices generally pass through, and/or other types of trends. The cell analytics information may be used, for example, by a service provider associated with the cell, in order to modify cell parameters and/or hardware based on the identified trends. The cell analytics information may also be used for marketing and/or promotional purposes (e.g., targeted advertising based on types or identities of users associated with cells). In some implementations, the cell analytics information may be mapped to geographical regions (e.g., regions that correspond to ZIP codes), in order to enhance the marketing and/or promotional value of the information.

Figure 5:
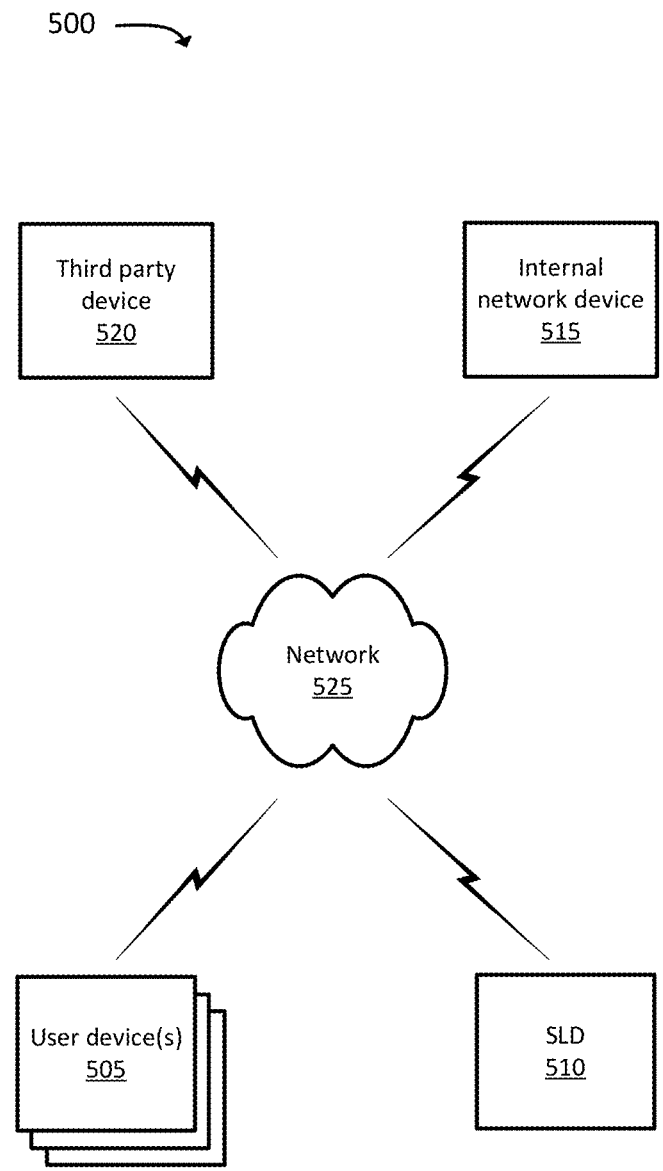
FIG. 5 illustrates an example of an environment, in which systems and/or methods, described herein, may be implemented.

FIG. 5 illustrates an example environment 500, in which systems and/or methods described herein may be implemented. As shown in FIG. 5, environment 500 may include one or more user devices 505, SLD 510, internal network device 515, third party device 520, and network 525. The quantity of devices and/or networks, illustrated in FIG. 5, is provided for explanatory purposes only. In practice, environment 500 may include additional devices and/or networks; fewer devices and/or networks; different devices and/or networks; or differently arranged devices and/or networks than illustrated in FIG. 5. Alternatively, or additionally, one or more of the devices of environment 500 may perform one or more functions described as being performed by another one or more of the devices of environments 500. Devices of environment 500 may interconnect with each other and/or other devices via wired connections, wireless connections, or a combination of wired and wireless connections.

User device 505 may include any computation and communication device, such as a wireless mobile communication device that is capable of communicating with one or more networks (e.g., network 525). For example, user device 505 may include a radiotelephone, a personal communications system ("PCS") terminal (e.g., a device that combines a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a camera, a television, a set-top device ("STD"), a personal gaming system, a wearable device, and/or another type of mobile computation and communication device. User device 505 may receive connectivity to network 525 via services provided by a service provider, such as an Internet service provider ("ISP"). An ISP may, in some implementations, be a wireless telecommunications provider (e.g., a cellular telecommunications provider).

SLD 510 may include one or more computation, communication, and/or storage devices that receive and/or store information regarding the geographic locations of user devices 505. SLD 510 may receive the location information from a network device (e.g., a device associated with a telecommunications network), and/or from another device (e.g., a device that works with a telecommunications network in order to determine location information for user devices 505. SLD 510 may receive updates to location information relatively frequently, such as whenever location information is obtained by the network device and/or another device. For instance, SLD 510 may receive location updates for user device 505 when a network event, associated with user device 505, occurs. As mentioned above, network events may correspond to calls being sent and/or received by user device 505, data connections being established and/or torn down, messages being sent and/or received, etc.

In some implementations, SLD 510 may be deployed in a cached, duplicated, and/or a distributed manner. For example, while one SLD 510 is shown in FIG. 5, in practice, multiple SLDs 510 may be present. Additionally, or alternatively, a single SLD 510 may store multiple instances of the same data, and/or may be distributed across multiple physical devices. By storing multiple instances of data, different devices (e.g., multiple internal network devices 515 and/or third party devices 520) may access location information, without significantly affecting the performance of SLD 510.

Internal network device 515 may include one or more computation, communication, and/or storage devices that access and/or analyze location information (e.g., as provided by SLD 510). Internal network device 515 may be, for example, a device that is associated with the same operator and/or service provider, with which SLD 510 is associated. For example, SLD 510 and internal network device 515 may be associated with the same telecommunications network service provider. In some implementations, internal network device 515 may only be reachable, by SLD 510, via a private address (e.g., a private IP address that may only be able to be resolved within a particular network) associated with internal network device 515. Additionally, or alternatively, internal network device 515 may access SLD 510 using a private address associated with SLD 510. As described below, internal network device 515 may analyze and/or otherwise utilize information, received from SLD 510. For example, internal network device 515 may generate network analytics information that a service provider, associated with a network, can use to improve aspects of the network (e.g., performance aspects, monetization aspects, etc.).

Third party device 520 may include one or more computation, communication, and/or storage devices that access and/or analyze location information (e.g., as provided by SLD 510). Third party device 520 may be, for example, a device that is associated with a different operator and/or service provider, with which SLD 510 is associated. In some implementations, SLD 510 and third party device 520 may be associated with different operators and/or service providers who have contracted and/or otherwise agreed that third party device 520 may access information associated with SLD 510. In some implementations, third party device 520 may be reachable, by SLD 510, via a public address (e.g., an IP address that may able to be resolved, over the Internet, by a public Domain Name System ("DNS") server). Additionally, or alternatively, third party device 520 may communicate with SLD 510 using a public address associated with SLD 510. As described below, third party device 520 may analyze and/or otherwise utilize information, received from SLD 510. For example, third party device 520 may be associated with a bank, a payment card processor, an advertising service, and/or another entity that is interested in obtaining location information for user device 505.

Network 525 may include one or more networks, via which user device 505, SLD 510, internal network device 515, and/or third party device 520 may communicate. For example, network 525 may include an evolved packet system ("EPS") that includes a Long Term Evolution ("LTE") network and/or an evolved packet core ("EPC") network that operate based on a third generation partnership project ("3GPP") wireless communication standard. The LTE network may be, or may include, a radio access network ("RAN") that includes one or more base stations, some or all of which may take the form of an eNodeB ("eNB"), via which user device 505 and/or another device may communicate with the EPC network. The EPC network may include one or more serving gateways ("SGWs"), mobility management entities ("MMEs"), and/or packet data network ("PDN") gateways ("PGWs"), and may enable user device 505 to communicate with a PDN (e.g., the Internet) and/or an IP Multimedia Subsystem ("IMS") core network. The IMS core network may manage authentication, session initiation, account information, a user profile, etc. associated with user device 505.

Network 525 may additionally, or alternatively, include a wide area network ("WAN"), a metropolitan area network ("MAN"), the Internet, a fiber optic-based network, and/or a combination of these or other types of networks. Network 525 may include one or more wireless networks in addition to, or in lieu of, an LTE network. For example, network 525 may include a Code Division Multiple Access ("CDMA") 2000 1x network, a second generation ("2G") wireless network, a third generation ("3G") wireless network, a fourth generation ("4G") wireless network, a fifth generation ("5G") wireless network, a "Wi-Fi" wireless network (e.g., a network that operates according to an Institute of Electrical and Electronics Engineers ("IEEE") 802.11-based standard), and/or another wireless network. In some implementations, network 525 may be communicatively coupled to one or more other networks.

Figures 6, 7:
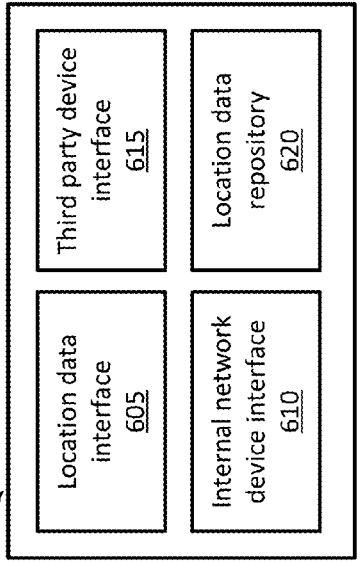
FIG. 6 illustrates example functional components of a subscriber location database, in accordance with some implementations.
FIG. 7 illustrates an example data structure associated with a subscriber location database.

FIG. 6 illustrates example functional components of SLD 510, in accordance with some implementations. As shown, SLD 510 may include location data interface 605, internal network device interface 610, third party device interface 615, and location data repository 620. In other implementations, SLD 510 may include additional, fewer, different, and/or differently arranged modules. Further, some, or all, of the functionality of one or more modules may be performed by one or more other modules.

Location data interface 605 may serve as an interface between SLD 510 and an external device, or set of devices, via which location data interface 605 receives location information associated with one or more user devices 505. For example, as mentioned above, the location information may be received from a telecommunications service provider, and/or another device or system that obtains location information regarding user devices 505. Location data interface 605 may be an implementation of an API, via which location data interface 605 can receive the location information Internal network device interface 610 may include an interface (e.g., an IP interface and/or an implementation of an API) between SLD 510 and internal network device 515. As mentioned above, the interface, to internal network device 515, may be accessed via a private IP address. In some implementations, internal network device interface 610 may include proprietary and/or secure protocols, in order to ensure that internal network device 515 is a "trusted" device associated with a particular service provider and/or operator. Via internal network device interface 610, SLD 510 may provide location information to internal network device 515. For example, internal network device interface 610 may include protocols via which internal network device 515 may request location information associated with a particular MDN or set of MDNs, location information associated with a particular geographic location or area, location information based on the occurrence of certain types of events (e.g., when a new user device 505 is detected, when a location for a particular user device 505 has not been updated for a particular amount of time, etc.).

Third party device interface 615 may include an interface (e.g., an IP interface and/or an implementation of an API) between SLD 510 and third party device 520. As mentioned above, the interface, to third party device 520, may be accessed via a public IP address. In some implementations, third party device interface 615 may include standard and/or secure protocols, in order to ensure that third party device 520 is a "trusted" device (e.g., a device that has been determined as being allowed to access information stored by SLD 510). Via third party device interface 615, SLD 510 may provide location information to third party device 520. For example, third party device interface 615 may include protocols via which third party device 520 may request location information associated with a particular MDN or set of MDNs, location information associated with a particular geographic location or area, location information based on the occurrence of certain types of events (e.g., when a new user device 505 is detected, when a location for a particular user device 505 has not been updated for a particular amount of time, etc.).

Location data repository 620 may store location information regarding one or more user devices 505, such as information received via location data interface 605. As mentioned above, location data repository 620 may include one or more physical devices, that may store one or more instances of data. In some implementations, location data repository 620 may be distributed in a hierarchical manner. For example, a first storage device (or set of storage devices) may receive location information, and may propagate some or all of the data to a second storage device (or set of storage devices), and so on. That is, while shown as a single block in FIG. 6, location data repository 620 may include multiple physical devices, which may be integrated within the same physical enclosure or the same data center, or located in diverse regions.

FIG. 7 illustrates an example data structure 700 that may be stored by SLD 510 (e.g., by location data repository 620). As mentioned above, SLD 510 may store multiple instances of information; in these situations, SLD 510 may store multiple instances of data structure 700 (or multiple SLDs 510) may each store one or more instances of data structure 700. As shown, data structure 700 may include location information for multiple user devices 505. Example data structure 700 may be conceptually arranged in rows and columns, where each row represents location information for a particular user device. The user devices 505 may be identified by MDN in some implementations, while in other implementations, the user devices 505 may be identified by one or more other identifiers (e.g., an IP address, a Session Initiation Protocol ("SIP") address, an International Mobile Subscriber Identity ("IMSI") value, an International Mobile Station Equipment Identity ("IMEI") value, etc.).

As shown, information regarding N locations (where N is an integer greater than or equal to 1), for each user device 505, may be stored. For example, data structure 700 may store the last five locations for a particular user device 505, the last ten locations, all received locations, etc. In some implementations, data structure 700 may store a different quantity of locations for different user devices 505.

For each location, data structure 700 may store information regarding the geographical location (e.g., latitude and longitude coordinates, shown in the figure as "<Lat>" and "<Lon>"), a timestamp, an accuracy value, and a cell identifier ("ID"). The timestamp, for a particular location record, may indicate a time at which the location was measured, and/or received by SLD 510. The accuracy value may indicate, for instance, a distance (e.g., expressed in meters) from the specified location that the user device may be located. This distance may, in some implementations, correspond to the radius of a circle, for which the location (e.g., the latitude and longitude) is the center. The accuracy value, for a particular location record, may be based upon a pre-determined confidence level, which may typically be approximately 90%. The accuracy value may be received from an external device or system that provided the location information to SLD 510. The cell identifier, for a particular location record, may indicate an identifier of a serving cell, of a telecommunications network (e.g., a cellular network), to which user device 505 was connected when the location record was generated.

Figure 8:
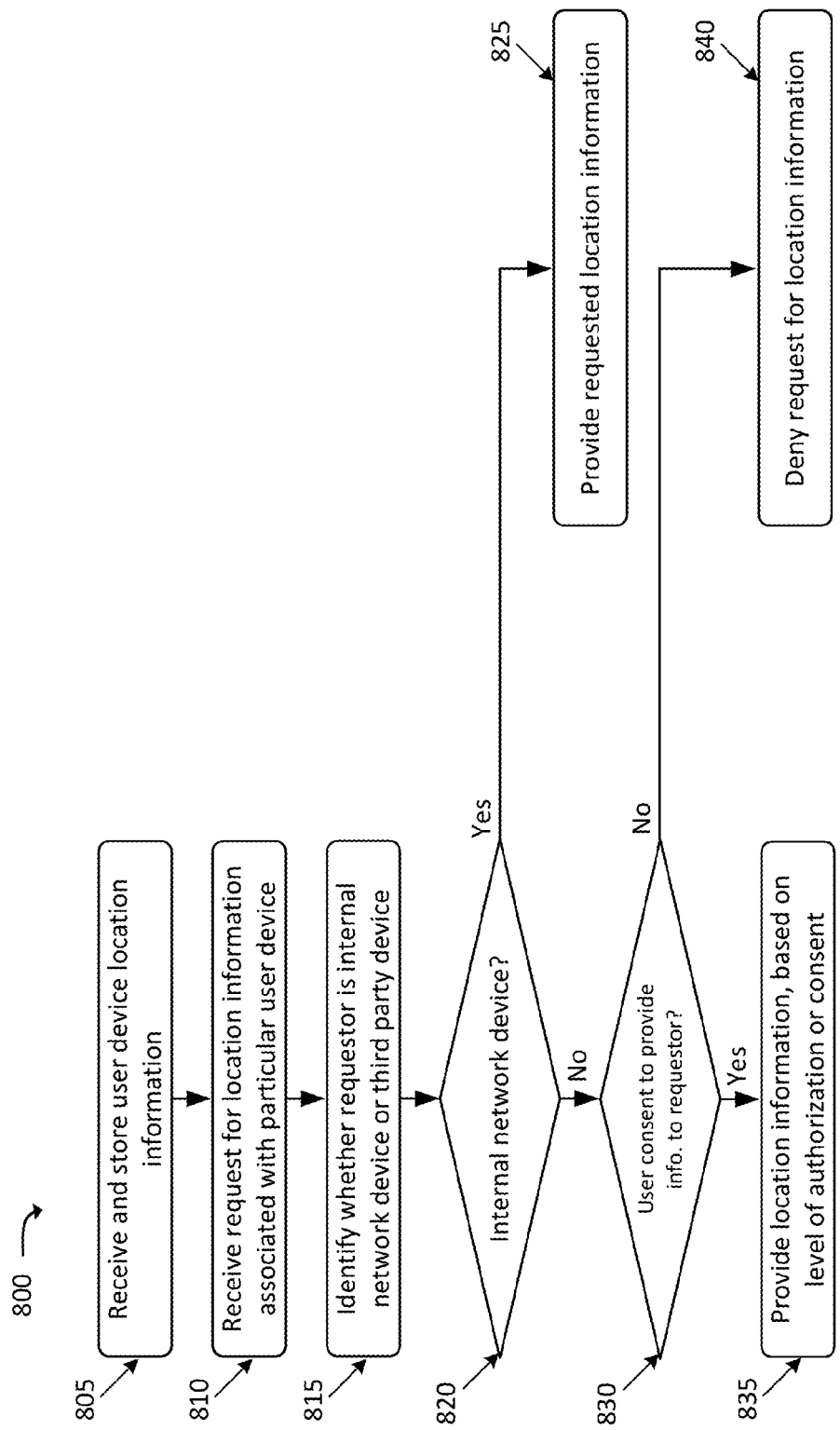
FIG. 8 illustrates an example process for providing location information, in accordance with some implementations.

FIG. 8 illustrates an example process 800 for providing location information regarding a user device. Process 800 may, in some implementations, be performed by SLD 510. In other implementations, some or all of process 800 may be performed by one or more other devices.

Process 800 may include receiving and storing (at 805) user device location information. For example, as described above with respect to location data interface 605, SLD 510 may receive location information, regarding one or more user devices 505, from an external device or system (e.g., a system that collects or otherwise determines location information based on the occurrence of network events, and/or using other techniques, including conventional techniques). As also mentioned above (e.g., with respect to location data repository 620), storing the location information may include storing multiple instances of the information (e.g., in multiple caches, which may be collocated or geographically distributed).

Process 800 may further include receiving (at 810) a request for location information associated with a particular user device. For example, SLD 510 may receive a request (e.g., via internal network device interface 610 or third party device interface 615) for location information. The request may be received from, for example, internal network device 515 or third party device 520.

Process 800 may include identifying (at 815) whether the requestor is an internal network device or a third party device. For example, SLD 510 may determine whether the request was received via internal network device interface 610 or third party device interface 615. Additionally, or alternatively, the request may include identifying information, based on which SLD 510 may identify the requestor. In some implementations, SLD 510 may authenticate the requestor, in order to determine whether the requestor is authorized to access location information. For instance, the request may include authentication information, such as an encrypted authentication token, a password, and/or other authentication or security-related information.

If the requestor is an internal network device (at 820-YES), then process 800 may include providing (at 825) the latest location and/or location history information. For example, SLD 510 may provide location information, specified in the request. For instance, the request may identify one or more user devices 505, for which location information is requested. As another example, the request may identify geographic locations and/or regions, for which location information is requested. As yet another example, the request may specify a set of triggers, based on which SLD 510 should output, or "push," location information to the requestor. For instance, a particular trigger may indicate that the MDN of a user device, for which location information has not been updated for six hours, should be provided to the requestor. In some implementations, the request may indicate an amount of location information requested (e.g., a quantity of previous locations, only the last known location, etc.).

Since the requestor is an internal network device 515, SLD 510 may assume that a user, of user device 505, has consented to the location information being used internally, with respect to the network. For example, the user may have agreed to internal use of location information, associated with user device 505, when registering for access to the network. In other implementations, SLD 510 may confirm or determine whether the user has provided consent for the location information being used internally.

If, on the other hand, the requestor is not an internal network device (at 820-NO), then it may be assumed that the requestor is a third party device (or purports to be a third party device). Process 800 may include determining (at 830) whether the third party device is authorized, and/or whether a user, associated with the user device, has consented to provide information to the requestor. If the user has consented to provide information to the requestor (at 830-YES), then process 800 may include providing (at 835) the requested location information, based on a level of authorization or consent. For example, users may provide differing levels of consent to different third party devices 520 (e.g., whether only the last known location can be provided, how often the location information may be provided, a quantity of previous locations that may be provided, etc.). Further, a user may authorize some third party devices 520 to access location information associated with the user device 505, while not authorizing other third party devices 520.

If the user has not consented to provide the information to the requestor, and/or if the requestor is not otherwise authorized to receive the information (at 830-NO), then process 800 may include denying (at 840) the request for location information.

Figure 9:
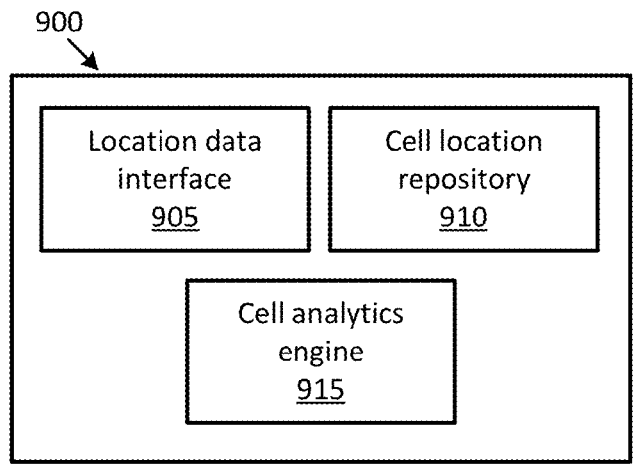
FIG. 9 illustrates example functional components of a cell analytics server, in accordance with some implementations.

FIG. 9 illustrates example functional components of cell analytics server 900, in accordance with some implementations. Cell analytics server 900 may be, for example, an implementation of a particular internal network device 515. As shown, cell analytics server 900 may include location data interface 905, cell location repository 910, and cell analytics engine 915. In other implementations, cell analytics server 900 may include additional, fewer, different, and/or differently arranged modules. Further, some, or all, of the functionality of one or more modules may be performed by one or more other modules.

Location data interface 905 may serve as an interface between cell analytics server 900 and SLD 510, via which cell analytics server 900 may request and receive, from SLD 510, location information associated with one or more user devices 505. For example, as mentioned above, the location information may be received from a telecommunications service provider, and/or another device or system that obtains location information regarding user devices 505. Location data interface 905 may be an IP interface and/or implementation of another API.

Cell location repository 910 may include information identifying locations of cells, associated with a particular telecommunications network server provider. A "cell" may refer to, for example, a coverage area, or set of coverage areas, associated with a particular base station, a portion of a base station (e.g., a set of radio transceivers associated with a base station), a set of base stations, etc. The information, for a particular cell, stored in cell location repository 910, may indicate, for instance, the bounds of a particular cell (e.g., latitude and longitude coordinates which, when taken together, form an outline of the cell). As another example, a cell location may be expressed in terms of a point (e.g., a set of latitude and longitude coordinates) and a radius. In some implementations, cell location repository 910 may store a location of a single cell. In other implementations, cell location repository 910 may store locations for multiple cells, such as cells associated with a particular region, cells associated with a particular radio access technology, all cells associated with the telecommunications network, etc. The information, stored by cell location repository 910, may be received from, for example, the telecommunications network service provider and/or another source.

In some implementations, in addition to, or in lieu of information stored by cell location repository 910, the location data, received via location data interface 905, may indicate cell identifiers. For example, a particular location information record, received via location data interface 905, may indicate an MDN of a particular user device 505, a latitude and longitude, and a cell identifier for a cell to which user device 505 was connected when the location was determined.

Cell analytics engine 915 may generate analytics information, for a cell (or set of cells) based on location information (received via 905) and cell location information (stored by cell location repository 910). For example, using the cell location information, cell analytics engine 915 may identify location information that corresponds to the same location as a particular cell. Thus, cell analytics engine 915 may be able to identify location information for user devices 505 on a per-cell basis. As mentioned above, the location information may indicate an identity of user devices 505 (e.g., MDNs associated with user devices 505). Using the identity information, cell analytics engine 915 may be able to determine trends associated with cells, such as how long user devices 505 tend to remain connected to cells, how many different user devices 505 connect to cells, etc.

For example, if a particular cell is located in an airport or shopping center, cell analytics engine 915 may determine, based on location information (received via 905), that the particular cell has a relatively high amount of turnover. As another example, cell analytics engine 915 may determine an average time spent, per user device 505, connected to a particular cell. As yet another example, cell analytics engine 915 may segment the information based on times of day, days of weeks, seasons, etc. For example, cell analytics engine 915 may determine certain trends during the week, while determining other trends during the weekend.

These types of information may be used, for example, for advertising purposes, network planning purposes, or other purposes. For example, certain types of advertising may be provided to user devices 505 that are connected to a cell with high turnover, versus a cell with low turnover. High turnover cells may be associated with, for example, generic or wide-interest advertising, while low turnover cells may be associated with more focused advertising.

Figure 10:
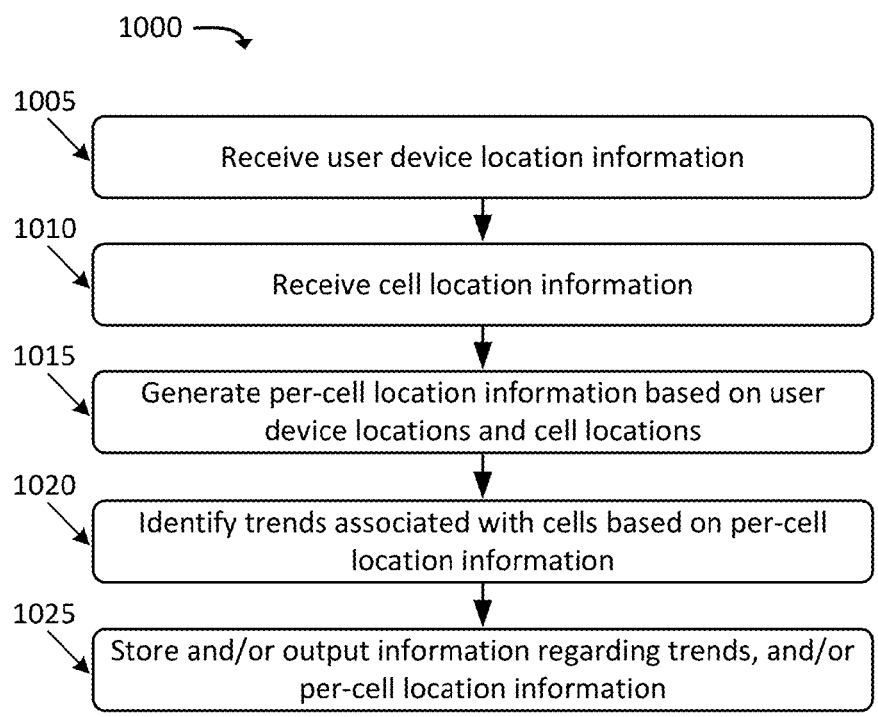
FIG. 10 illustrates an example process for determining trends or other analytics information associated with a set of cells.

FIG. 10 illustrates an example process 1000 for determining trends on a per-cell basis. In one example implementations, some or all of process 1000 may be performed by cell analytics server 900. In other implementations, some or all of process 1000 may be performed by one or more other devices.

As shown, process 1000 may include receiving (at 1005) user device location information. For example, as discussed above with respect to location data interface 905, cell analytics server 900 may receive location information regarding a set of user devices 505. In some implementations, cell analytics server 900 may request location information that corresponds to a particular cell, or set of cells. For instance, cell analytics server 900 may provide a cell identifier, and/or a region, in the request. Process 100 may further include receiving (at 1010) cell location information (e.g., via location data interface 905).

Process 1000 may additionally include generating (at 1015) per-cell location information based on user device locations and cell locations. For example, as discussed above with respect to cell analytics engine 915, cell analytics server 900 may segment the received information on a per-cell basis. In some implementations, cell analytics engine 915 may use information, stored by cell location repository 910, to segment the location information on a per-cell basis. Additionally, or alternatively, the location information may include cell identifiers, based on which cell analytics server 900 may segment the location information.

Process 1000 may also include identifying (at 1020) trends associated with cells based on the per-cell location information. For example, as discussed above with respect to cell analytics engine 915, cell analytics server 900 may determine, for example, an average amount of time that user devices 505 spent within a cell, an average number of different user devices 505 present in a cell per amount of time, or other trends. The trends may be segmented based on various factors, such as time of day, day of week, seasons, etc.

Process 1000 may further include storing and/or outputting (at 1025) the information regarding the trends, and/or the per-cell location information. For example, cell analytics server 900 may output the trend information for application of the information. For example, an advertiser may use the information to generate targeted advertising, a network service provider may use the information for network planning purposes, the information may be further segmented or analyzed in view of other information, etc.

Figure 11:
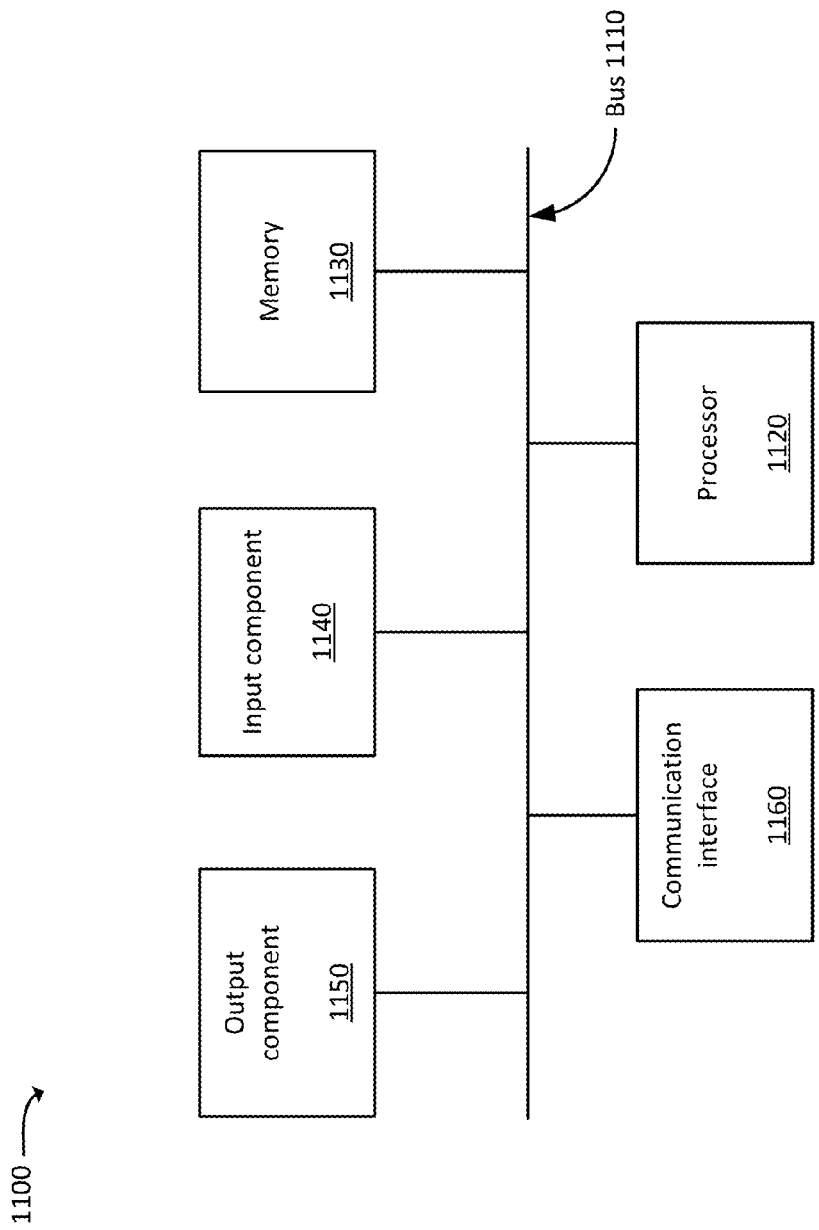
FIG. 11 illustrates example components of a device, in accordance with some implementations described herein.

FIG. 11 is a diagram of example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks have been described with regard to FIGS. 8 and 10, the order of the blocks may be modified in other implementations. Further, non-dependent blocks may be performed in parallel. Also, while an example data structure has been described with regard to FIG. 7, in practice, the data structure may include a linked list, an array, a table, a tree, a hash table, and/or another type of data structure.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   receiving, by a device, location information for each of a plurality of user devices;
   storing, in a storage device associated with the device, the received location information for each of the plurality of user devices, the storing including:
   associating a mobile directory number ("MDN"), associated with each of the plurality of user devices, with the location information associated with the each user device;
   receiving, by the device and from a requestor, a request for location information associated with a particular user device, the request including an MDN associated with the particular user device;
   determining, by the device, whether the requestor is authorized to access the location information associated with the particular user device;
   locating, by the device and based on determining that the requestor is authorized to access the location information associated with the particular user device, the requested location information in the storage device, the locating including:
   using the MDN, included in the request, to identify the stored location information associated with the MDN included in the request; and
   providing, by the device and to the requestor, the requested location information associated with the MDN included in the request.

2. The method of claim 1, wherein the location information, for the particular user device, is determined based on occurrences of network events associated with the user device.

3. The method of claim 2, wherein the network events include at least one of:
   initiating a voice call by the particular user device,
   receiving a voice call by the particular user device,
   establishing a data connection with the particular user device,
   tearing down a data connection with the particular user device,
   receiving a message by the particular user device, or
   sending a message by the particular user device.

4. The method of claim 1, further comprising:
   determining that a user, associated with the user device, has provided consent for the requestor to receive the location information associated with the user device,
   wherein the providing is performed based on determining that the user has provided consent for the requestor to receive the location information associated with the user device.

5. The method of claim 4, further comprising:
   receiving another request, from another requestor, for the location information associated with the particular user device;
   determining that the user has not provided consent for the other requestor to receive the location information associated with the user device; and
   denying the other request, from the other requestor and based on the determining, for the location information.

6. The method of claim 1, wherein the requestor is associated with a bank or payment card processor, and
   wherein the request is made based on a payment attempt by a user associated with the particular user device.

7. The method of claim 6, wherein the requestor maintains information associating a payment card, associated with the user, with the MDN, associated with the particular user device.

8. The method of claim 1, wherein the requestor is associated with an advertiser, and
   wherein the advertiser uses the location information to generate or provide location-based advertising to the particular user device.

9. A subscriber location database device, comprising:
   a memory device storing:
   location information for a plurality of user devices, the location information associating a mobile directory number ("MDN"), associated with each of the plurality of user devices, with the location information associated with the each user device, and
   a set of processor-executable instructions; and a processor configured to execute the processor-executable instructions, wherein executing the computer-executable instructions causes the processor to:
  receive, from a requestor, a request for location information associated with a particular user device, of the plurality of user devices,
    the request including an MDN associated with the particular user device;
  determine whether the requestor is authorized to access the location information associated with the particular user device;
  identify, based on determining that the requestor is authorized to access the location information associated with the particular user device, the location information, stored in the storage device, that is associated with the MDN included in the request; and
  provide, to the requestor, the identified location information that is associated with the MDN included in the request.

10. The subscriber location database device of claim 9, wherein the location information, for the particular user device, is determined based on occurrences of network events associated with the user device.

11. The subscriber location database device of claim 10, wherein the network events include at least one of:
  initiating a voice call by the particular user device,
  receiving a voice call by the particular user device,
  establishing a data connection with the particular user device,
  tearing down a data connection with the particular user device,
  receiving a message by the particular user device, or
  sending a message by the particular user device.

12. The subscriber location database device of claim 9, wherein executing the processor-executable instructions further cause the processor to:
  determine that a user, associated with the particular user device, has provided consent for the requestor to receive the location information associated with the particular user device,
  wherein the providing is performed based on determining that the user has provided consent for the requestor to receive the location information associated with the particular user device.

13. The subscriber location database device of claim 12, wherein executing the processor-executable instructions further cause the processor to:
  receive another request, from another requestor, for the location information associated with the particular user device;
  determine that the user has not provided consent for the other requestor to receive the location information associated with the user device; and
  deny the other request, from the other requestor, for the location information.

14. The subscriber location database device of claim 9, wherein the requestor is associated with a bank or payment card processor, and
  wherein the request is made based on a payment attempt by a user associated with the particular user device.

15. The subscriber location database device of claim 14, wherein the requestor maintains information associating a payment card, associated with the user, with the MDN, associated with the particular user device.

16. The subscriber location database device of claim 9, wherein the requestor is associated with an advertiser, and
  wherein the advertiser uses the location information to generate or provide location-based advertising to the particular user device.

17. A non-transitory computer-readable medium, storing processor-executable instructions, which, when executed by one or more processors of a device, cause the one or more processors to:
  store, in a memory of the device, location information for a plurality of user devices, the location information associating a mobile directory number ("MDN"), associated with each of the plurality of user devices, with the location information associated with the each user device, and
  receive, from a requestor, a request for location information associated with a particular user device, of the plurality of user devices,
    the request including an MDN associated with the particular user device;
  determine whether the requestor is authorized to access the location information associated with the particular user device;
  identify, based on determining that the requestor is authorized to access the location information associated with the particular user device, the location information, stored in the storage device, that is associated with the MDN included in the request; and
  provide, to the requestor, the identified location information that is associated with the MDN included in the request.

18. The non-transitory computer-readable medium of claim 17, wherein the location information, for the particular user device, is determined based on occurrences of network events associated with the user device.

19. The non-transitory computer-readable medium of claim 17, wherein executing the processor-executable instructions further cause the processor to:
  determine that a user, associated with the particular user device, has provided consent for the requestor to receive the location information associated with the particular user device,
  wherein the providing is performed based on determining that the user has provided consent for the requestor to receive the location information associated with the particular user device.

* * * * *